(12) United States Patent
Ravishankar et al.

(10) Patent No.: US 8,213,416 B2
(45) Date of Patent: Jul. 3, 2012

(54) METHODS, SYSTEMS, AND COMPUTER READABLE MEDIA FOR EARLY MEDIA CONNECTION PROXYING

(75) Inventors: Venkataramaiah Ravishankar, Cary, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 520 days.

(21) Appl. No.: 12/476,032

(22) Filed: Jun. 1, 2009

(65) Prior Publication Data
US 2009/0304173 A1    Dec. 10, 2009

Related U.S. Application Data

(60) Provisional application No. 61/057,622, filed on May 30, 2008.

(51) Int. Cl.
*H04L 12/66* (2006.01)
(52) U.S. Cl. .................................. 370/352; 379/221.09
(58) Field of Classification Search .................. 370/352; 379/221.09
See application file for complete search history.

(56) References Cited

U.S. PATENT DOCUMENTS

| | | | | |
|---|---|---|---|---|
| 2008/0259909 A1* | 10/2008 | Runeson et al. | ............... | 370/352 |
| 2009/0022283 A1* | 1/2009 | Pollitt | ............................. | 379/87 |
| 2011/0092206 A1* | 4/2011 | Wong et al. | ................ | 455/435.1 |

OTHER PUBLICATIONS

Camarillo, "The Early Session Disposition Type for the Session Initiation Protocol (SIP)," RFC 3959, pp. 1-11 (Dec. 2004).
Rosenberg, "The Session Initiation Protocol (SIP) UPDATE Method," RFC 3311, pp. 1-13 (Sep. 2002).
Rosenberg et al., "An Offer/Answer Model with the Session Description Protocol (SDP)," RFC 3264, pp. 1-24 (Jun. 2002).
Rosenberg et al., "Reliability of Provisional Responses in the Session Initiation Protocol (SIP)," RFC 3262, pp. 1-14 (Jun. 2002).
Handley et al., "SDP: Session Description Protocol," RFC 4566, pp. 1-49 (Jul. 2006).

* cited by examiner

*Primary Examiner* — Creighton Smith
(74) *Attorney, Agent, or Firm* — Jenkins, Wilson, Taylor & Hunt, P.A.

(57) ABSTRACT

Methods, systems, and computer readable media for early media connection proxying are disclosed. According to one method, a call setup signaling message is received for establishing a call between a calling entity and a called entity. Based on at least one parameter in the call setup signaling message, it is determined whether an early media connection is required for the call. It is also determined whether early media connection proxying is required for the call. In response to determining that an early media connection and early media connection proxying are required for the call, signaling is performed on behalf of a network entity to establish an early media connection for the call.

23 Claims, 10 Drawing Sheets

METHODS, SYSTEMS, AND COMPUTER READABLE MEDIA FOR EARLY MEDIA CONNECTION PROXYING

RELATED APPLICATIONS

This application claims the benefit of U.S. Provisional Patent Application Ser. No. 61/057,622 filed May 30, 2008; the disclosure of which is incorporated herein by reference in its entirety.

TECHNICAL FIELD

The subject matter described herein relates to interworking between applications. More specifically, the subject matter relates to methods, systems, and computer readable media for early media connection proxying.

BACKGROUND

For regular voice calls in a signaling system 7 (SS7)-based network, such as the public switched telephone network (PSTN), a bearer channel for the call is reserved in the forward direction from the originating node to the terminating node before the called party is alerted to the call. Only after the bearer channel has been established between the originating node and the terminating node is the called party's phone rung so that he or she may answer the call. For example, when a calling party dials a telephone number, an originating service switching point (SSP) sends an ISDN user part (ISUP) initial address message (IAM) to reserve a trunk circuit from the originating SSP to the destination SSP. Once the destination SSP receives the IAM, the destination SSP may return an address complete message (ACM) in the backward direction to indicate that the trunk circuit between the originating SSP and the destination SSP has been reserved. The destination SSP also rings the called party to indicate an incoming call. When the called party answers (i.e., goes off hook), the destination SSP returns an answer message (ANM) to the originating switch and begins billing the call.

For more advanced calls, such as those requiring calling party interaction with an automated system before connection, the call is initially connected to an interactive voice response (IVR) application before connecting the call to a called party. In an IVR application, media may be received from the calling party and, in response, audio may be generated by the IVR for navigating a series of audio menus/prompts. Typical examples of early media generated by the calling party in an IVR call include voice commands and dual tone multi-frequency (DTMF) tones (i.e., touch tones), and typical examples of early media generated by the IVR application include pre-recorded or dynamically generated audio, such as audio menu(s) and/or prompt(s). In a call that requires early IVR interaction, the call arrives at a destination SSP and is connected to the IVR application instead of ringing the called party in order to provide a period for interacting with the calling party before connecting the call to the called party. Because these types of calls involve media interaction early in the process of connecting a call to the called party (i.e., before ringing the called party), they are referred to herein as "early media" calls. As used herein, the term "early media" refers to media (e.g., data, audio, and/or video) that is exchanged between the calling party and another entity separate from the called party before a media connection is accepted by the called party.

In contrast to PSTN call establishment where media trunks are set up as call signaling proceeds in a forward direction from the calling party, in session initiation protocol (SIP) networks, before a bearer channel is established, media negotiation must take place between the originating and terminating endpoints. For example, the session description protocol (SDP) may be used in conjunction with SIP or other higher layer protocols for conveying sufficient information for SIP endpoints to discover and participate in a multimedia session. SDP is more fully described in RFC 4566, which is incorporated by reference herein in its entirety.

One problem associated with providing early media in a SIP network is that SIP networks require a 2xx response to be sent from a user agent server (UAS) to a user agent client (UAC) before media can be exchanged. Because the 2xx response is triggered when a called party answers a call, and early media exchange typically occurs before the called party answers, early media is not possible without modifying basic SIP network functionality.

SIP procedures for early media are described in Internet Engineering Task Force (IETF) requests for comments (RFCs) 3959, 3262, 3264, and 3311, the disclosures of each of which are incorporated by reference herein in their entireties. One such procedure specified in RFC 3959 defines a new "early session" disposition type for SIP. The early session disposition type described in RFC 3959 defines an offer/answer model based on SDP wherein one session participant generates and sends an SDP offer message to another session participant (i.e., the answerer). The SDP offer includes the set of media streams and codecs the offerer wishes to use, along with the IP addresses and ports the offerer would like to use to receive the media. In response to receiving the offer, the answerer generates an answer which includes a matching media stream for each stream in the offer, indicating whether the stream is accepted or not, along with the codecs that will be used and the IP addresses and ports that the answerer wants to use to receive media.

Even though early media extensions have been defined for SIP networks, not all SIP entities support the early media extensions. For example, if a SIP endpoint supports the SIP early media extensions but a SIP user agent server does not support the early media extensions, early media will not work for a call involving the two entities. In another example, early media extensions will not work when a call crosses the PSTN boundary where the PSTN gateway does not support SIP early media extensions.

FIG. 1 is a network diagram illustrating the failure to provide early media to a SIP endpoint when a PSTN gateway does not support SIP early media extensions. Referring to FIG. 1, SIP user agent client (UAC) 100 is located in SIP/IMS network 102 and places a call to a subscriber located in PSTN 104. In this case, UAC 100 initiates an offer by sending SIP INVITE message 106 constituting SDP offer A to MGC/MG or softswitch 108 (hereinafter, "softswitch"). Softswitch 108 converts INVITE message 106 into ISUP IAM 110 and forwards IAM 110 to destination SSP 112. At this time, a bearer channel has been established between the media gateway component of softswitch 108 and SSP 112 because SSP 112 has received a valid IAM (i.e., IAM 110) and both the media gateway and SSP 112 have reserved a trunk circuit for the call. SSP 112 may then communicate with IVR IN SCP 114 in order determine the content of media 116 (e.g., an audio announcement) to be played over the bearer channel. For example, IVR IN SCP 114 may instruct SSP 112 or a separate media server (not shown in FIG. 1) to play an announcement over the established bearer channel.

However, in the example illustrated in FIG. 1, no bearer channel has yet been reserved between UAC 100 and softswitch 108 because softswitch 108 does not support SIP early media extensions. Accordingly, early media is not possible for the scenario illustrated in FIG. 1.

Accordingly, in light of these difficulties, a need exists for improved methods, systems, and computer readable media for early media proxying.

SUMMARY

Methods, systems, and computer readable media for early media connection proxying are disclosed. According to one method, a call setup signaling message is received for establishing a call between a calling entity and a called entity. Based on at least one parameter in the call setup signaling message, it is determined whether an early media connection is required for the call. It is also determined whether early media connection proxying is required for the call. In response to determining that an early media connection and early media connection proxying are required for the call, signaling is performed on behalf of a network entity to establish an early media connection for the call.

According to another aspect of the subject matter described herein, a system for early media connection proxying is provided. The system includes an early media connection proxy implemented on a network node, the network node including a network interface for receiving a call setup signaling message for establishing a call between a calling entity and a called entity. The SIP early media connection proxy further including a service creation interaction manager (SCIM) for determining based on at least one parameter in the call setup signaling message, whether an early media connection is required for the call, for determining whether early media connection proxying is required for the call, and, in response to determining that an early media connection and early media connection proxying are required for the call, for signaling on behalf of a network entity to establish an early media connection for the call.

The subject matter described herein for early media connection proxying may be implemented using a computer readable medium having stored thereon executable instructions that when executed by the processor of a computer, control the computer to perform steps. Exemplary computer readable media suitable for implementing the subject matter described herein includes disk memory devices, chip memory devices, programmable logic devices, and application specific integrated circuits. In one implementation, the computer readable medium may include a memory accessible by a processor. The memory may include instructions executable by the processor for implementing any of the methods for early media connection proxying described herein. In addition, a computer readable medium that implements the subject matter described herein may be distributed located on a single device or computing platform or may be across multiple physical devices and/or computing platforms.

BRIEF DESCRIPTION OF THE DRAWINGS

The subject matter described herein will now be explained with reference to the accompanying drawings of which.

DETAILED DESCRIPTION

In order to provide for early media connection proxying, one embodiment of the subject matter described herein includes a service mediation function for intercepting the SIP INVITE message at a SIP signaling router (SSR) and providing mediation between early media compliant SIP UACs and non-early media-compliant SIP UASs. This service mediation function may be implemented as a service capability interaction manager (SCIM) for Internet multimedia subsystem (IMS) networks or as a SCIM functional equivalent for pre-IMS networks. In alternate embodiments the service mediation or SCIM may be implement at other communication network elements, such as a SIP server, a SIP gateway, a call session control function, a network router, an application server, a mobile switching center, a session border controller, a breakout gateway controller, a SIP-PSTN gateway, or other communications network elements or functional entities. As networks continually transition from one technology to the next, service mediation becomes increasingly important. Service mediation includes SCIM, service interworking, and service normalization. Service mediation solutions, such as those described herein, should be flexible and extensible for accommodating new technologies and services. As will be described in greater detail below, service mediation may be accomplished by leveraging existing signaling architectures for providing seamless service interworking for fixed, mobile, and next generation network (NGN) network operators to deliver IMS compatible solutions.

In one exemplary implementation, the subject matter described herein may use SIP protocol extensions that include the class of 18x provisional responses (e.g., 180, 181, etc.) for handling early media, such as tone announcement services, IVR services, and so on. According to one embodiment, a SCIM/service mediation function may be configured to process 18x-class provisional responses on behalf of media gateway resources in a network in order to facilitate the handling of early media. The SCIM may intercept or otherwise receive incoming INVITE messages and analyze them to determine whether service mediation is required. For example, parameter values included in the INVITE message may be compared with pre-provisioned data that indicates whether the parameters indicate that an early media connection is required. One example of a parameter that indicates an early media connection is required is the early session disposition type in the content disposition field: early session. If an early media connection is determined to be required, the SCIM may be configured to instruct a media relay server (MRS) to provide the appropriate early media to the originating SIP UAC. The SCIM may determine the appropriate early media to play by interacting with a PSTN IVR SCP or receiving messages intercepted from such an SCP.

Figure 1:
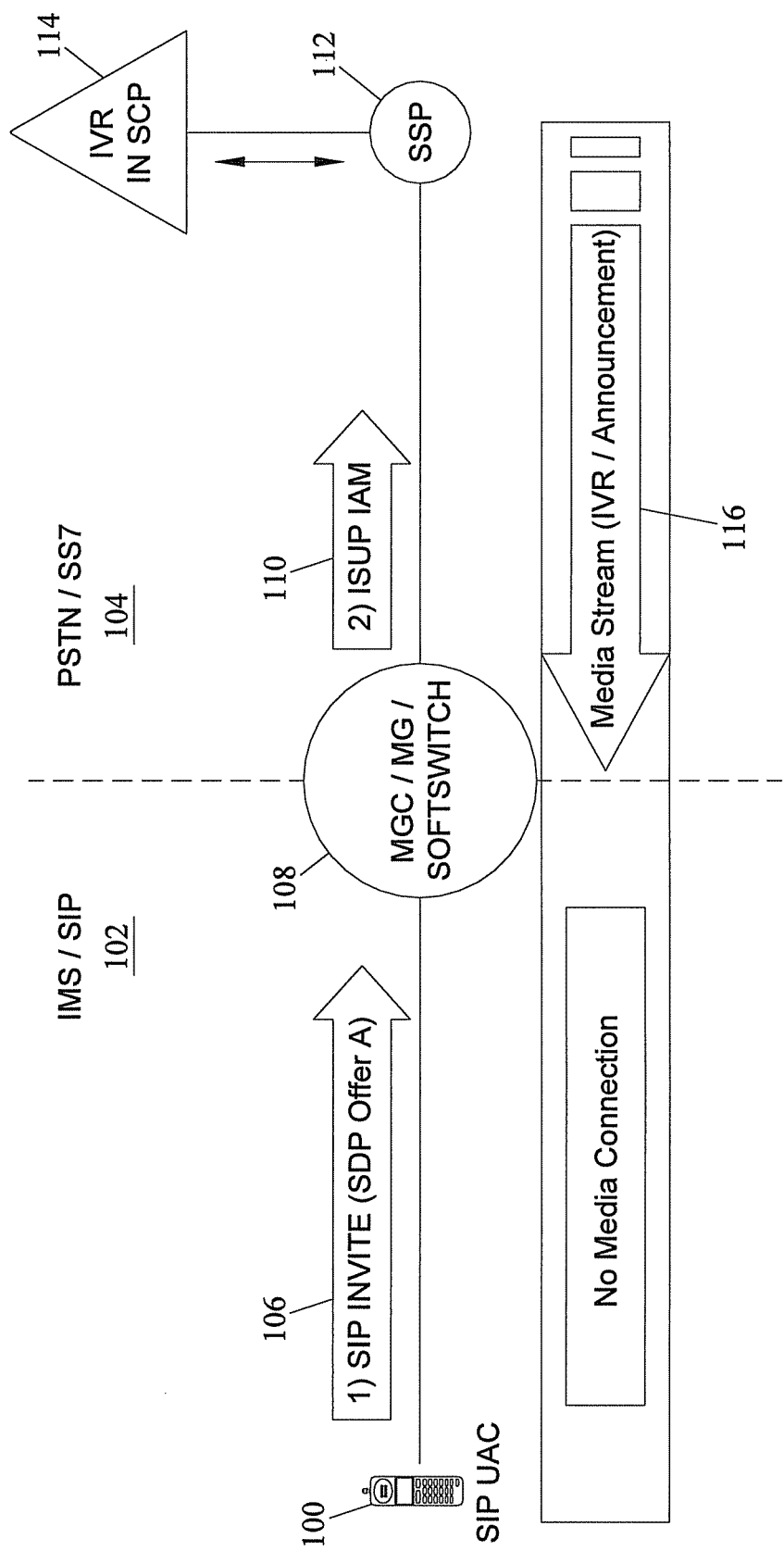
FIG. 1 is a network and message flow diagram illustrating an IP-PSTN call where early media interaction with an IP calling party is not possible.
Figure 2:
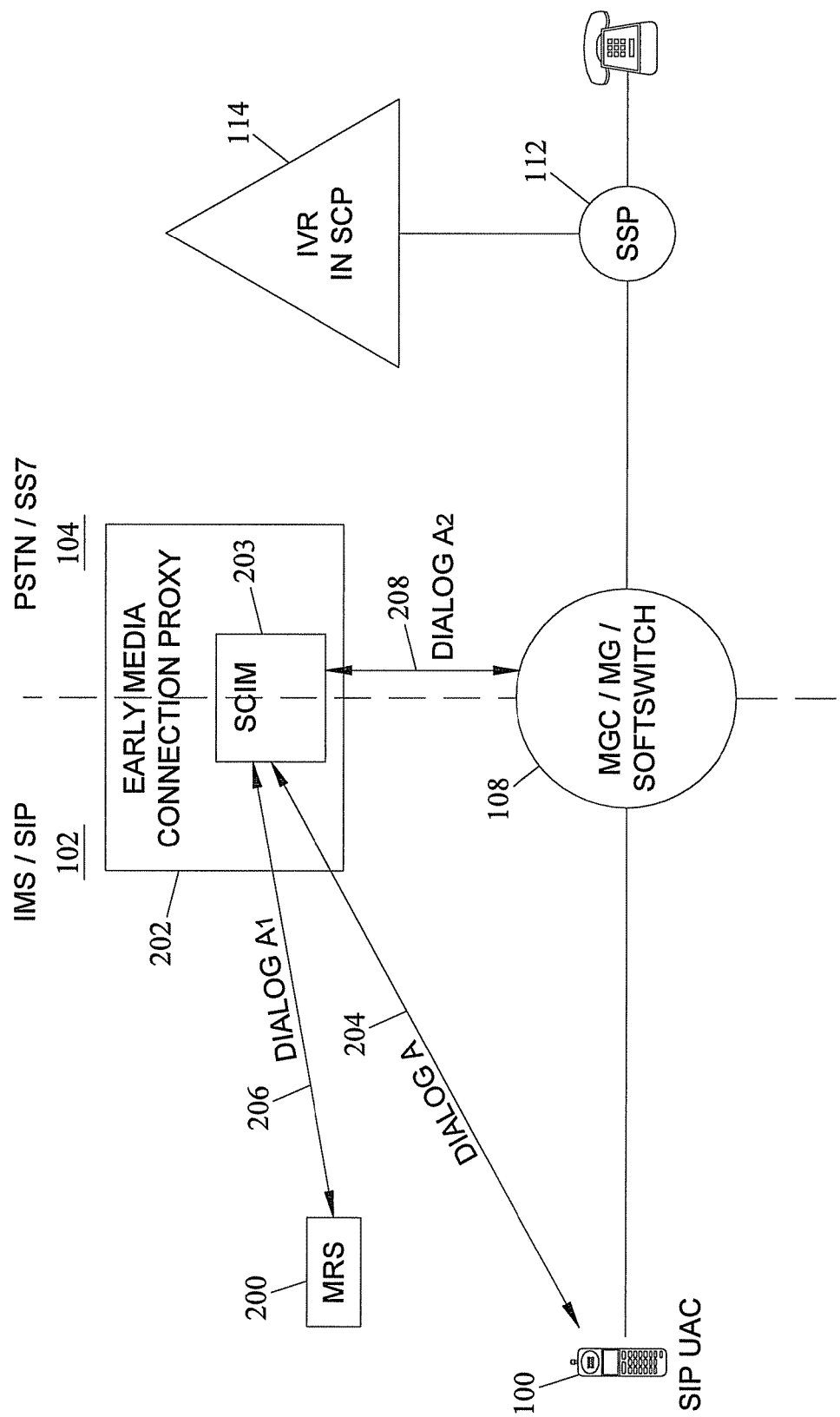
FIG. 2 is a network diagram illustrating a service capability interaction manager for facilitating early media interactions according to an embodiment of the subject matter described herein.

FIG. 2 is an exemplary network diagram illustrating a SCIM for providing early media proxying according to an embodiment of the subject matter described herein. Referring to FIG. 2, the left side of the diagram represents a SIP-based network, such as an IMS network 102, while the right side of the diagram represents an SS7-based network, such as the public switched telephone network (PSTN) 104. SIP UAC 100 and media relay server 200 reside in SIP network 102. SSP 112 and IVR IN SCP 114 reside in PSTN 104. Softswitch 108 and an early media connection proxy 202 reside at the boundary between SIP network 102 and PSTN 104. Early media connection proxy 202 may provide for early media connection proxying for connections between SIP entities that support the SIP extensions for early media and entities that do not support such extensions. In the illustrated example, it is assumed that softswitch 108 does not support the extensions for early media connection proxying. In one embodiment, early media connection proxy 202 may be implemented on a signal transfer point (STP) platform with SIP signaling router (SSR) capabilities and SCIM capabilities, as provided by SCIM 203.

In an exemplary scenario, SIP UAC 100 may send a SIP INVITE message to early media connection proxy 202. The INVITE message may be to initiate a call with a PSTN user connected to SSP 112. In response to the SIP INVITE message, early media connection proxy 202 creates a first dialog (i.e., dialog A 204) with SIP UAC 100. SCIM 203 of early media connection proxy 202 may be configured to receive a call setup signaling message for establishing a call and determining, based on at least one parameter in the call setup signaling message, whether an early media connection is required for the call. For example, SCIM 203 may intercept the INVITE message associated from UAC 100 and determine whether an early media connection is required for the call.

In this example, it is assumed that SCIM 203 determines that an early media interaction is required for the call. Because early media interaction is required for the call, SCIM 203 may determine whether early media connection proxying on behalf of a SIP entity that is incompatible with protocol extensions for early media connection is required for the call.

In this example, because softswitch 108 does not support SIP early media extensions, it may be determined that an early media connection proxying is required.

Finally, in response to determining that an early media connection and early media connection proxying are required for the call, signaling is performed to establish an early media connection for the call. For example, SCIM 203 may function as a back-to-back user agent (B2B-UA) and appears to SIP UAC 100 as a SIP UAS. SCIM 203 may exchange signaling information on the north-bound interfaces to first create a dialog with MRS 200 and then with softswitch 108. As shown in FIG. 2, SCIM 203 may establish dialog A1 206 with MRS 200 and establish dialog A2 208 with softswitch 108. SCIM 203 correlates dialog A, dialog A1, and dialog A2 as a single bound dialog.

Figure 3:
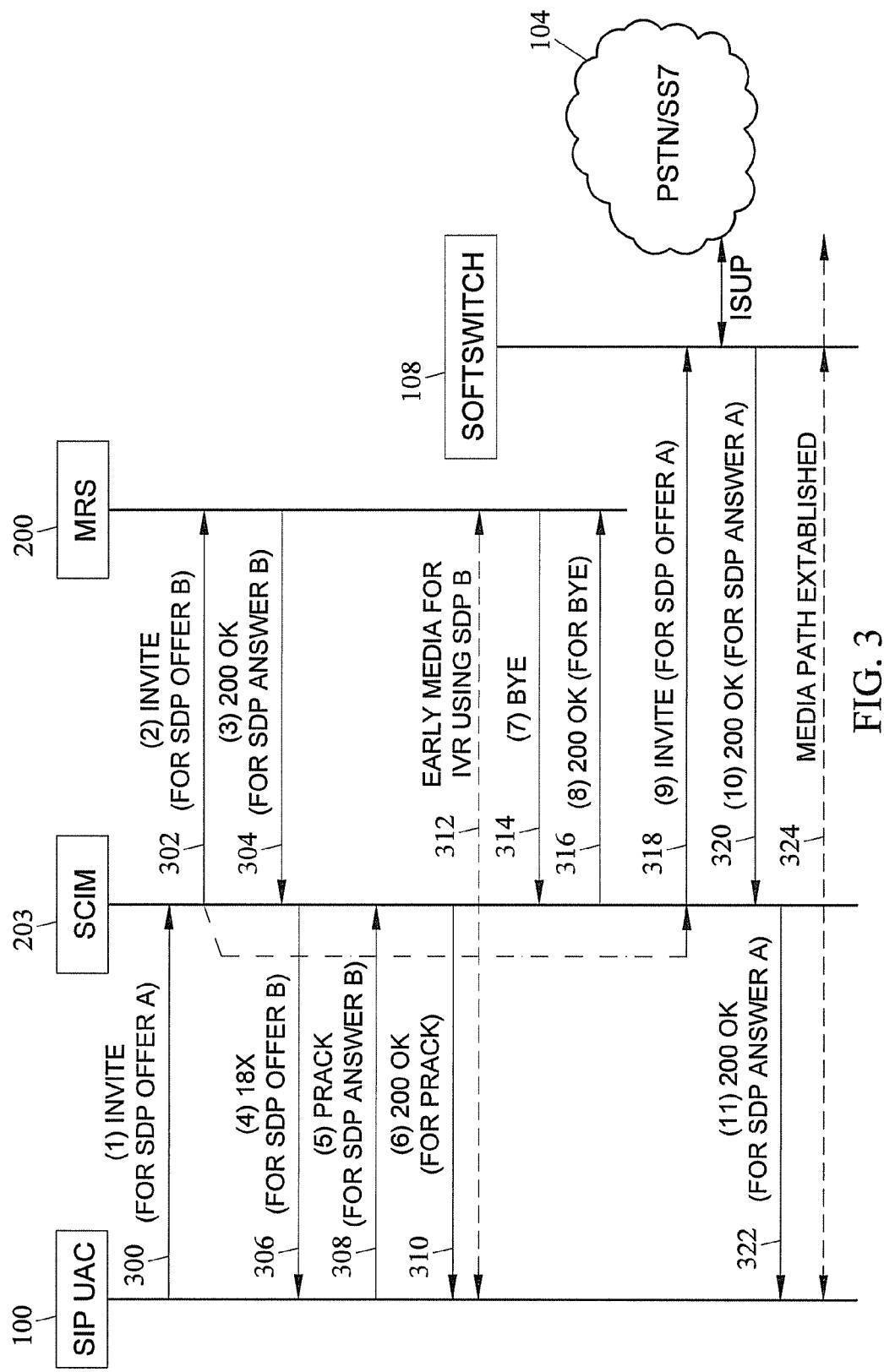
FIG. 3 is a call flow diagram illustrating exemplary signaling messages exchanged for early media connection proxying according to an embodiment of the subject matter described herein.

FIG. 3 is a call sequence diagram showing exemplary messaging for interworking between applications requiring early media interaction according to an embodiment of the subject matter described herein. Referring to FIG. 3, SIP UAC 100 may initiate a call by transmitting SIP INVITE message 300 including SDP offer A to SCIM 203. Based on one or more parameters in INVITE message 300, SCIM 203 determines that early media proxy services are required. Therefore, SCIM 203 may signal MRS 200 using a provisional 18x SIP message that includes SDP offer B, such as INVITE message 302. If MRS 200 accepts SDP offer B, then SCIM 203 may signal UAC 100 using a provisional 18x SIP message that includes SDP offer B. For example, upon receiving 200 OK message 304 from MRS 200, SCIM 203 may send 18x message 306 for SDP offer B to UAC 100.

If UAC 100 accepts SDP offer B (e.g., by sending provisional acknowledge (PRACK) message 308 to SCIM 203 to which SCIM 203 returns 200 OK message 310), then an early media session 312 may be established between UAC 100 and MRS 200 where, for example, an announcement may be played or an IVR function may be performed. It may be appreciated that SCIM 203 controls the function of MRS 200 for the required IVR interaction, for example, by obtaining service information from an IN SCP for the IVR interaction and communicating the service information to MRS 200. As mentioned above, IVR interaction logic may be pre-provisioned at SCIM 203 and co-located with one of an STP, an SSR, a SIP application server, or an IN SCP.

Once the MRS operation has been completed, MRS 200 may end the transaction by sending BYE message 314 to SCIM 203 and SCIM 203 may return corresponding 200 OK message 316 acknowledging BYE message 314. SCIM 203 may then signal softswitch 108 with the INVITE message 318 for SDP offer A that corresponds to original INVITE message 300 received from UAC 100. If softswitch 108 accepts SDP offer A, then softswitch 108 may respond by sending 200 OK message 320 to SCIM 203 (which also is accepted SCIM 203 and UAC 100 as indicated by 200 OK messages 320 and 322), thereby establishing a media session between UAC 100 and the called PSTN subscriber as indicated by established media path 324.

Figure 4:
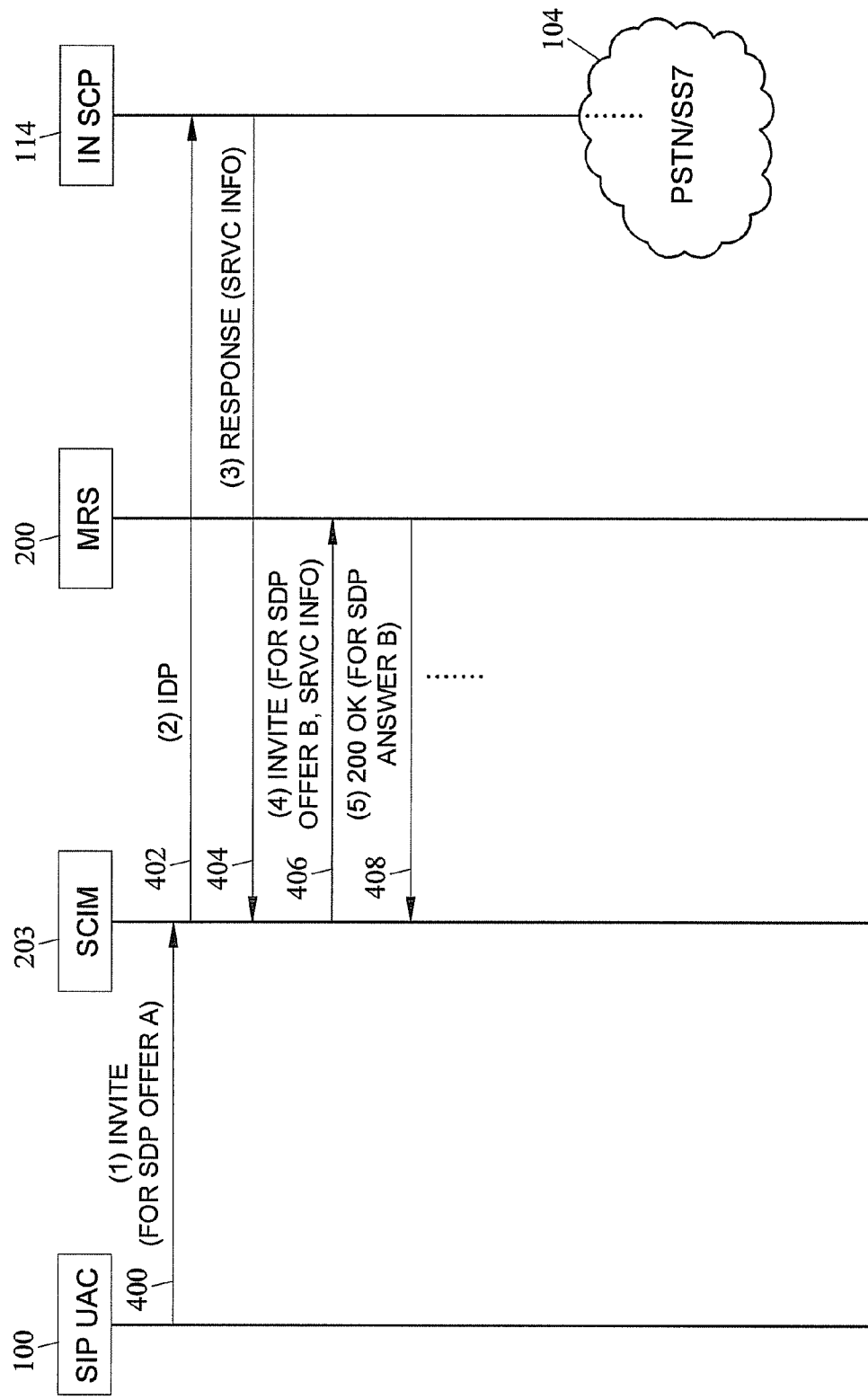
FIG. 4 is a call flow diagram illustrating exemplary signaling messages exchanged for early media connection proxying were service information for the early media connection is obtained from an intelligent network service control point (IN SCP) according to an embodiment of the subject matter described herein.

In FIG. 3, MRS 200 determines the content of the early media to be delivered to UAC 100 based on the INVITE message received from SCIM 203. In an alternate embodiment, SCIM 203 may obtain service interaction information from IN SCP 114 and communicates that information to MRS 200 for providing early media to SIP UAC 100. Referring to FIG. 4, SCIM 203 may be configured to intercept or otherwise receive an initial SIP INVITE message 400 from SIP UAC 100 to initiate a call with a called party, where the call is identified by SDP offer A. Trigger detection logic of SCIM 203 may detect that early media proxying is required and may generate an initial detection point (IDP) query 402 to IN SCP 114 to obtain information as to what early media should be delivered. IN SCP 114 may respond to the IDP query with a response 404 that includes the service information for playing the early media to SIP UAC 100. In response to receiving the service information, SCIM 203 generates an INVITE 406 and sends the INVITE to MRS 200. The INVITE contains SDP information for offering a media connection to MRS 200 (SDP offer B) and also contains the service information for playing the early media. In response to the INVITE, MRS 200 sends a 200 OK 408 to SCIM 203. The 200 OK answers SDP offer B. The remainder of the call flow in FIG. 4 is omitted as it is the same as messages 306-324 illustrated in FIG. 3. Thus, FIG. 4 illustrates the case where SCIM 203, in addition to performing early media proxying, obtains early media instructions from an IN SCP and delivers the instructions to a media relay server that provides the early media for the call.

Figure 5:
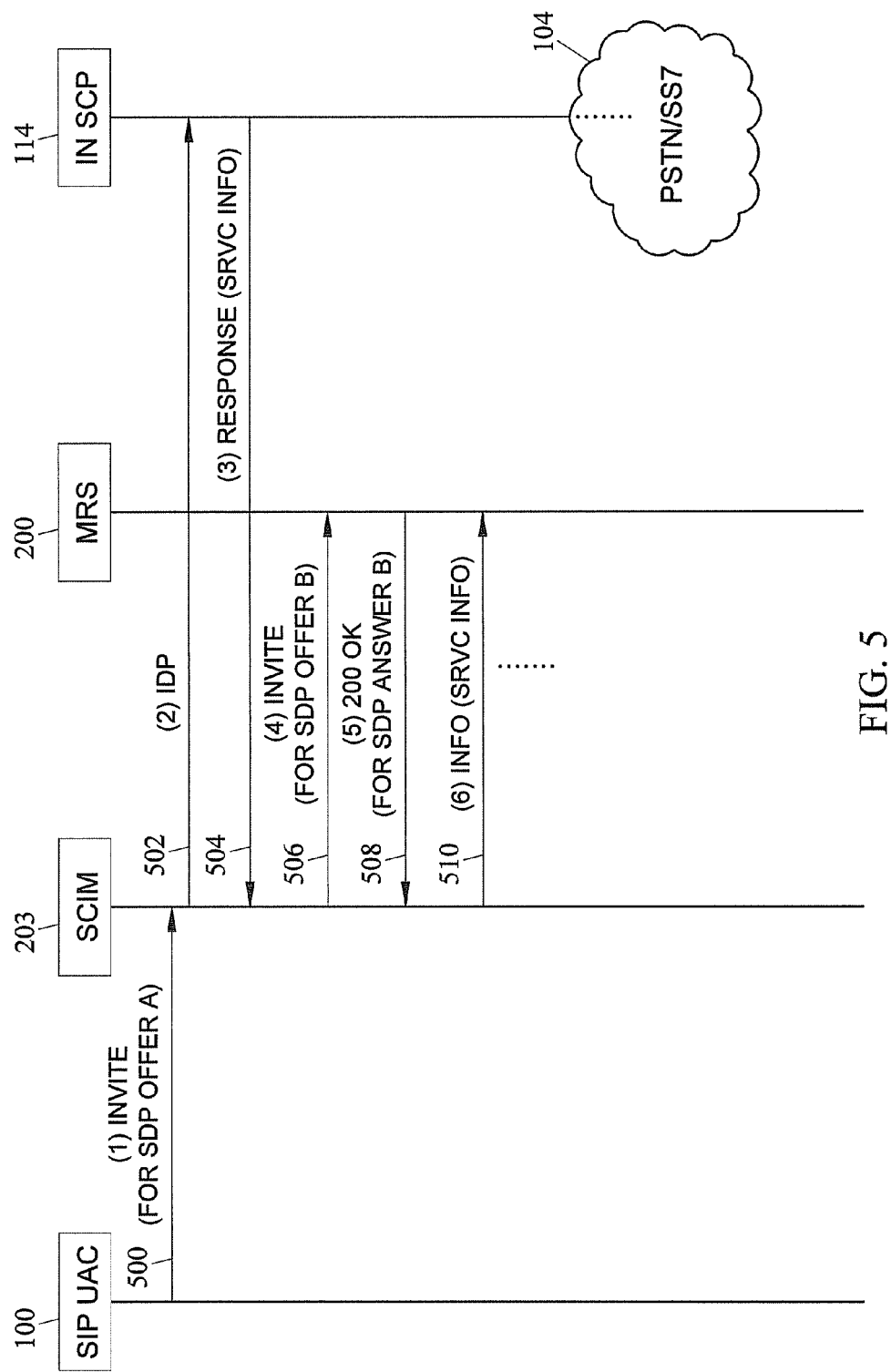
FIG. 5 is a call flow diagram illustrating exemplary signaling messages exchanged for early media connection proxying where service information for the early media connection is obtained from an IN SCP and the service information is communicated to a media relay server (MRS) using a SIP INFO message according to an embodiment of the subject matter described herein.

FIG. 5 illustrates yet another example where SCIM 203 obtains the service information for providing the early media from an IN SCP. However, rather than communicating the service information to the MRS in an INVITE message, as illustrated by message 406 in FIG. 4, in FIG. 5, SCIM 203 uses a SIP INFO message to communicate the service information to the MRS. Referring to FIG. 5, SIP UAC 100 sends INVITE message 500 for SDP offer A to SCIM 203. SCIM 203 receives or intercepts the message and determines that early media proxying is required and formulates and sends IDP 502 to IN SCP 114. IN SCP 114 responds to the IDP with response 504 containing the instructions for providing the early media for the call. SCIM 203 then initiates a dialog with MRS 200 by sending an INVITE 506 for SDP offer B. However, unlike INVITE 406 illustrated in FIG. 3, INVITE 506 does not include the service information for the early media. MRS 506 responds to the INVITE with 200 OK 508, establishing the dialog with SCIM 203. SCIM 203 then sends SIP INFO message 510 with the service information to MRS 200. Thus, in FIG. 5, the service information is communicated to the MRS using a SIP INFO message. However, any method for communicating the service information from SCIM 203 to media relay server 200 is intended to be within the scope of the subject matter described herein.

Figure 6:
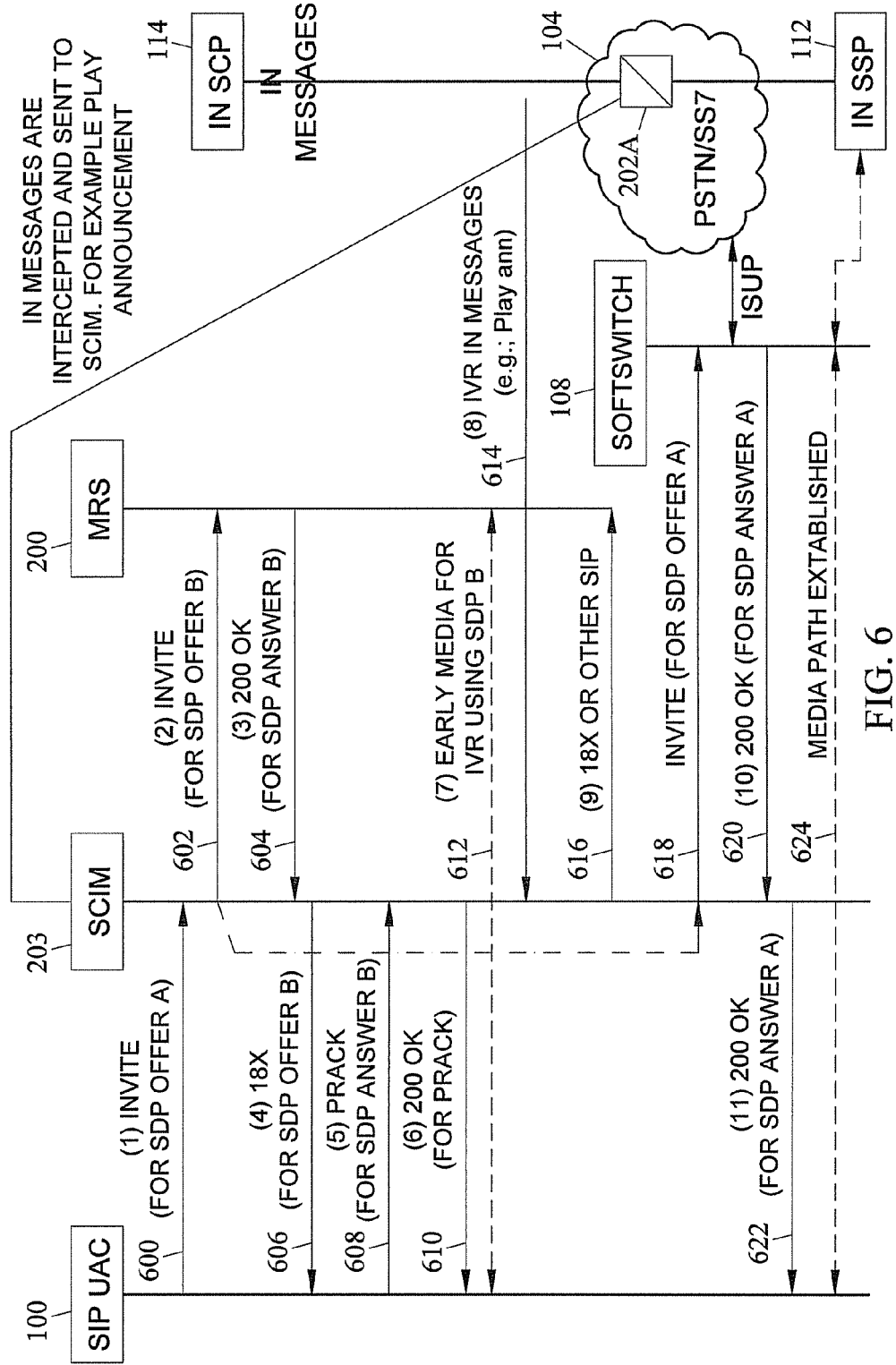
FIG. 6 is a call flow diagram illustrating exemplary signaling messages exchanged for early media connection proxying where an STP intercepts IN messages from an IN SCP to determine service information to be played over an early media connection according to an embodiment of the subject matter described herein.

In FIGS. 4 and 5, SCIM 203 queries the IN SCP to obtain the service information for providing the early media. In an alternate implementation, an STP may intercept message(s) from IN SCP 114 containing the service information and may provide that information to SCIM 203. In FIG. 6, the STP identified by reference number 202A, indicating it is part of early media connection proxy 202. It should be noted that SCIM 203 may be co-located with STP 202A, even though they are shown as separate entities in FIG. 6. Referring to FIG. 6, SIP UAC 100 sends SIP INVITE message 600 including SDP offer A to SCIM 203. Based on information included in INVITE message 600, SCIM 203 may determine that early media connection proxy services are required. SCIM 203 may then send INVITE 602 to MRS 200 to initiate the dialog with MRS 200 for the early media connection. SCIM 203 responds with 200 OK 604, which establishes the dialog with SCIM 203 for the early media connection. SCIM 203 may also send an INVITE message to IN SSP 112 for the early media connection, which causes IN SSP 112 to generate a query to IN SCP 114 for the type of media or service to be provided over the early media connection. IN SCP 114 may respond to the query with the appropriate media type, and such messages may be intercepted by STP 202A and delivered to SCIM 203.

After establishing the dialog with MRS 200, SCIM 203 initiates signaling with SIP UAC 100 to establish the dialog for the early media connection between SCIM 203 and UAC 100. This process is initiated by SCIM 203 sending a SIP 18x message for SDP offer B to UAC 100. SIP UAC 100 responds with PRACK message 608 to answer SDP offer B. SCIM 203 response with a 200 OK, and thereby establishes the dialog for the early media connection between SCIM 203 and SIP UAC 100.

Once the dialogs have been established, MRS 200 can provide early media 612 to SIP UAC 100. As stated above, STP 202A may intercept or analyze signaling messages between IN SCP 114 and SSP 112 relating to early media service and provide the signaling message(s) or the content relating to early media service to SCIM 203. SCIM 203 may use the information to instruct MRS 200 to provide early media to UAC 100. SCIM 203 communicates the early media to be provided to UAC 100 to MRS 200 by sending a SIP 18x 616 or other SIP message to MRS 200.

Once the early media has been provided to SIP UAC 100 and any required responses have been obtained from SIP UAC 100, SCIM 203 sends INVITE 618 to softswitch 108 for SDP offer A (the original call). Softswitch 108 responds by sending 200 OK 620 for SDP offer A and exchanges ISUP signaling with SSP 112. Once the 200 OK is received and the ISUP signaling is complete, a media patent for the call to the called party is established between SIP UAC 100 and SSP 114.

Figure 7:
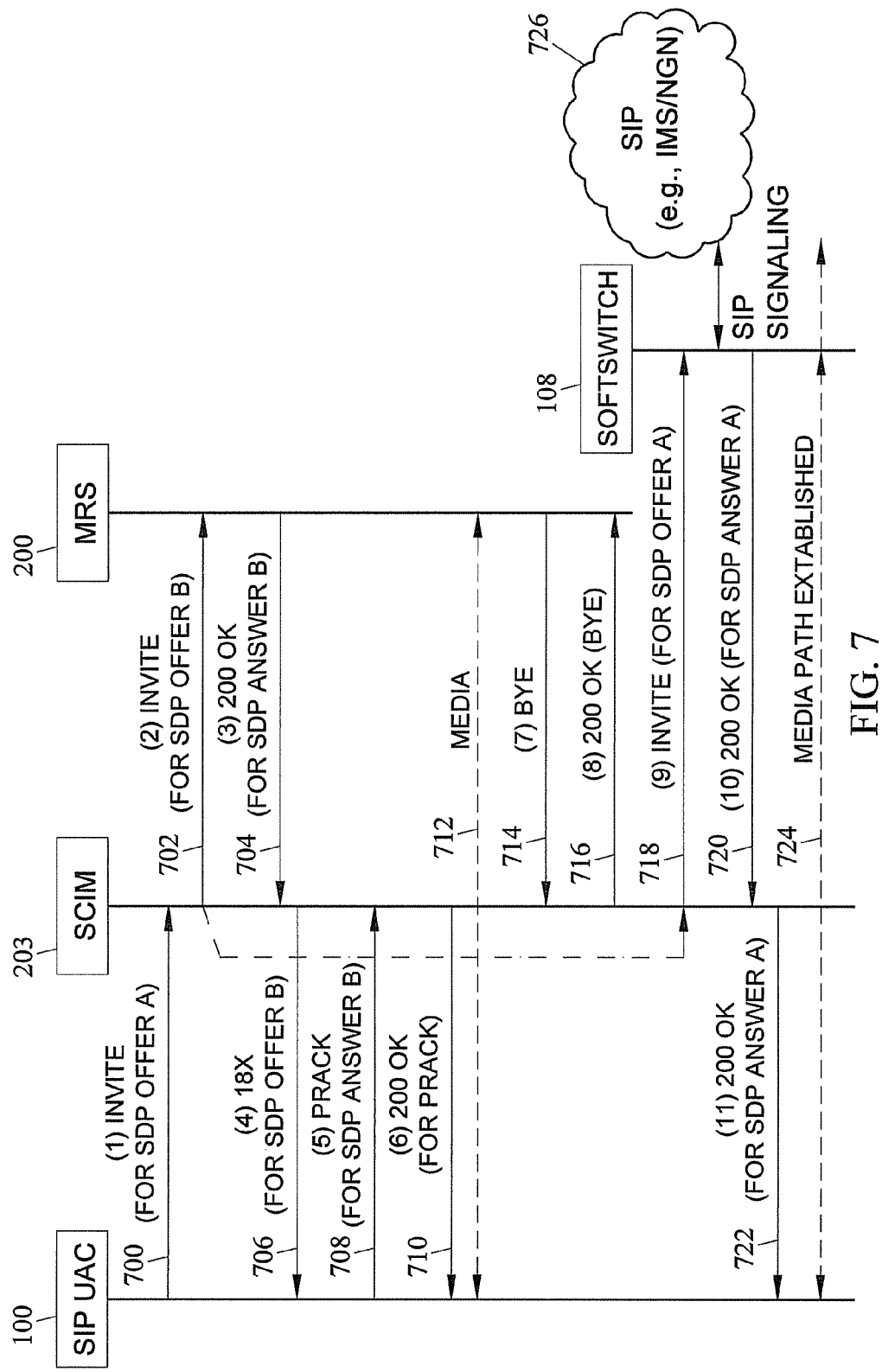
FIG. 7 is a call flow diagram illustrating exemplary signaling messages exchanged for early media connection proxying where the calling and called parties are both SIP entities according to an embodiment of the subject matter described herein.

Although the examples described above relate to performing SIP early media connection proxying for a call that crosses the SIP-PSTN boundary, the subject matter described herein is not limited to such an embodiment. Performing SIP early media connection proxying for any node that does not support the SIP extensions for early media proxying is intended to be within the scope of the subject matter described herein. FIG. 7 illustrates an example where SIP early media proxying is performed for an all SIP call according to an embodiment of the subject matter described herein. Referring to FIG. 7, SIP UAC 100 may initiate a call by transmitting SIP INVITE message 700 including SDP offer A to SCIM 203. Based on one or more parameters in INVITE message 700, SCIM 203 may determine that early media proxying services are required. Therefore, SCIM 203 may signal MRS 200 by sending INVITE message 702 that includes SDP offer B. If MRS 200 accepts SDP offer B, then SCIM 203 may signal UAC 100 using a provisional 18x SIP message that includes SDP offer B. For example, upon receiving 200 OK message 704 from MRS 200, SCIM 203 may send 18x message 706 for SDP offer B to UAC 100.

If UAC 100 accepts SDP offer B (e.g., by sending PRACK message 708 to SCIM 203 to which SCIM 203 returns 200 OK message 710), then an early media session 712 may be established between UAC 100 and MRS 208 where, for example, an announcement may be played or an IVR function may be performed.

Once the MRS operation has been completed, MRS 200 may end the early media transaction by sending BYE message 714 to SCIM 203, and SCIM 203 may return corresponding 200 OK message 716 acknowledging BYE message 714. SCIM 203 may then signal softswitch 108 with INVITE message 718 for SDP offer A that corresponds to original INVITE message 700 received from UAC 100. Softswitch 108 may exchange SIP signaling with SIP/IMS/NGN network 726 to establish a dialog with the called party. Once the dialog is established, softswitch 108 sends 200 OK message 720 to SCIM 720 to establish the media path with the calling party. Thus, the subject matter described herein is capable of performing SIP early media connection proxying for SIP to SIP calls.

Figure 8:
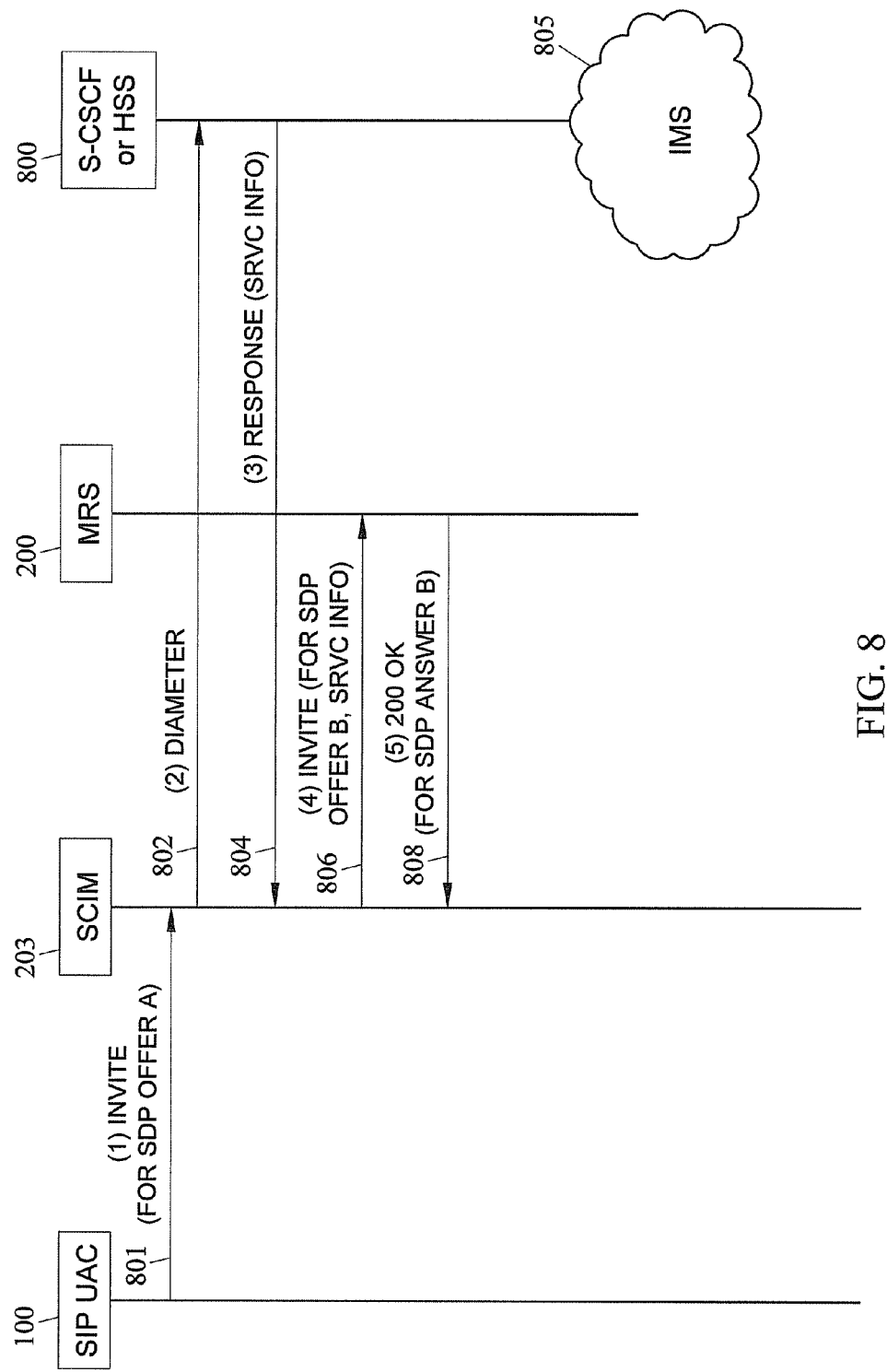
FIG. 8 is a call flow diagram illustrating exemplary signaling messages exchanged for early media connection proxying where the SCIM obtains service information for the early media connection from an IP multimedia subsystem (IMS) node according to an embodiment of the subject matter described herein.

In the examples described above, MRS 200 is either pre-provisioned with information as to which announcement or IVR service to play or obtains the information from an IN SCP. In the example illustrated in FIG. 8, MRS 200 obtains the information as to the media and/or services to provide over the early media connection from an IMS network element, such as a serving call session control function (S-SCSF) or home subscriber server (HSS) 800. Referring to FIG. 8, SCIM 203 may be configured to intercept or otherwise receive an initial SIP INVITE message from SIP UAC 100 and generate a DIAMETER message. For example, SCIM 203 may receive INVITE message 801 for SDP offer A. Based on information included in INVITE message 801, SCIM 203 may formulate and DIAMETER message 802 to S-CSCF or HSS 800 located in IMS network 805, which may respond with RESPONSE message 804 including service information such as the type of announcement or other information regarding the nature of the service to be provided over the early media connection. SCIM 203 may then send INVITE message 806 for SDP offer B that includes the service information provided in RESPONSE message 804 to MRS 200. MRS 200 may acknowledge and accept INVITE message 806 by returning 200 OK message 808 for SDP answer B.

Figure 9:
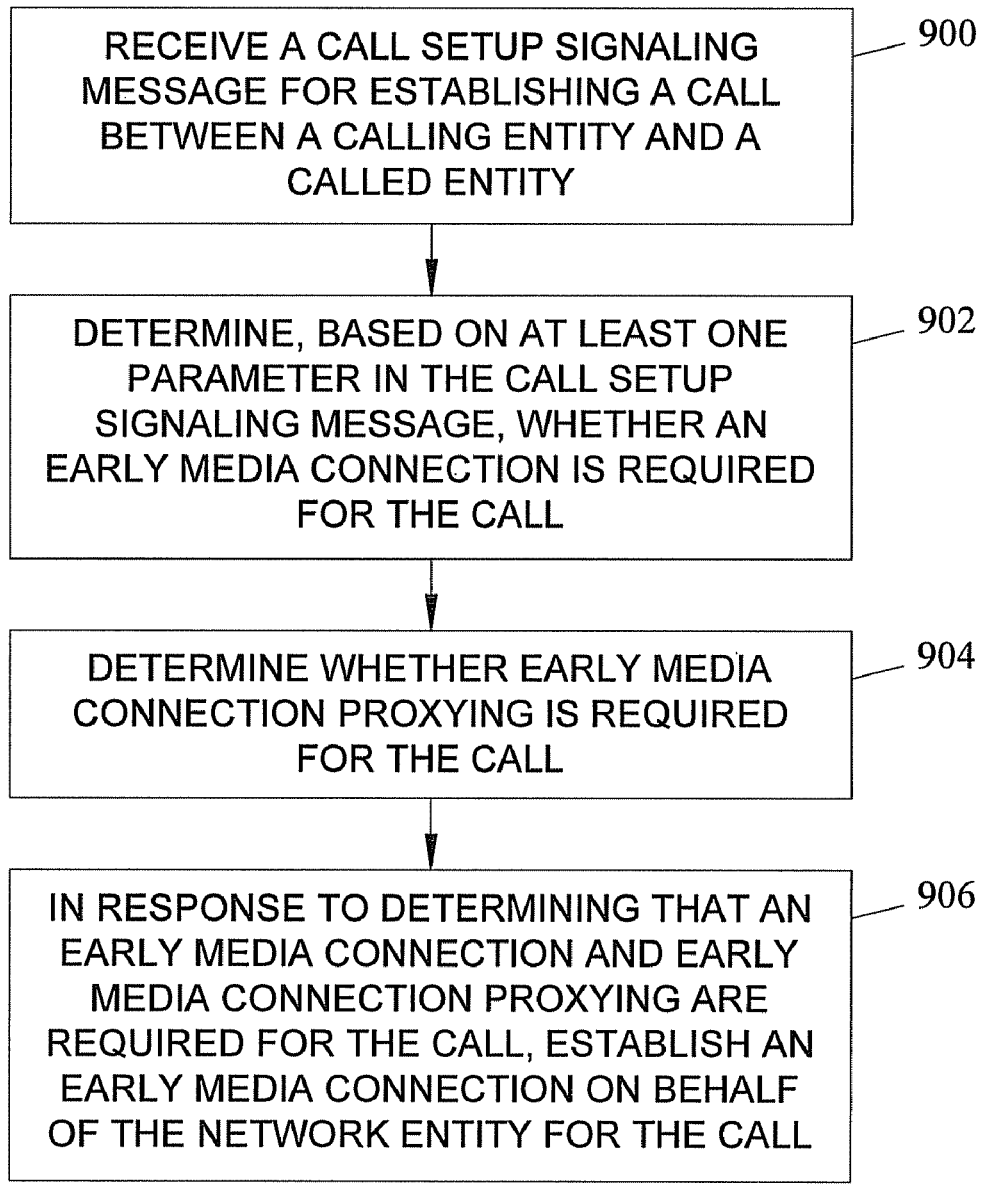
FIG. 9 is a flow chart illustrating exemplary steps for early media connection proxying according to an embodiment of the subject matter described herein.

FIG. 9 is a flow chart showing exemplary steps for early media connection proxying according to an embodiment of the subject matter described herein. The steps illustrated in FIG. 9 may be performed at an early media connection proxy implemented on a network node and using at least one processor of the network node. Referring to FIG. 9, in step 900, a call setup signaling message for establishing a call between a calling entity and a called entity is received. For example, a SIP INVITE message may be intercepted by a SCIM 203 implement by with at least one processor of an STP.

In step 902, it is determined whether an early media connection is required for the call based on at least one parameter in the call setup signaling message. For example, SCIM 203 may perform initial trigger analysis based on parameters in the signaling message and select service interaction logic and a service invocation rule set for providing the early media services.

In step 904, it is determined whether early media connection proxying for the call is required. For example, SCIM 203 may identify the call as a call that requires routing through a softswitch that lacks SIP early media capabilities. Such identification may be performed by provisioning in SCIM 203 a logical definition of a network element or a group of network elements that lack early media connection extension capabilities and identifying from the parameters in the call setup signaling message that the call must proceed through one of the network elements.

In step 906, in response to determining that an early media connection and early media connection proxying are required, an early media connection is established on behalf of the network entity for the call. SCIM 203 may exchange SIP early media extension signaling with the originating UAC and with the MRS that provides the SIP early media connection services. SCIM 203 may also exchange signaling with an IVR SCP, an STP, an S-SCSF, or an HSS to identify the early media services to be provided over the early media connection. SCIM 203 may then provide instruct the MRS as to which early media services to provide. Once the early media services are completed, SCIM 203 may perform signaling to tear down the early media connection and establish the media connection with the called party.

Figure 10:
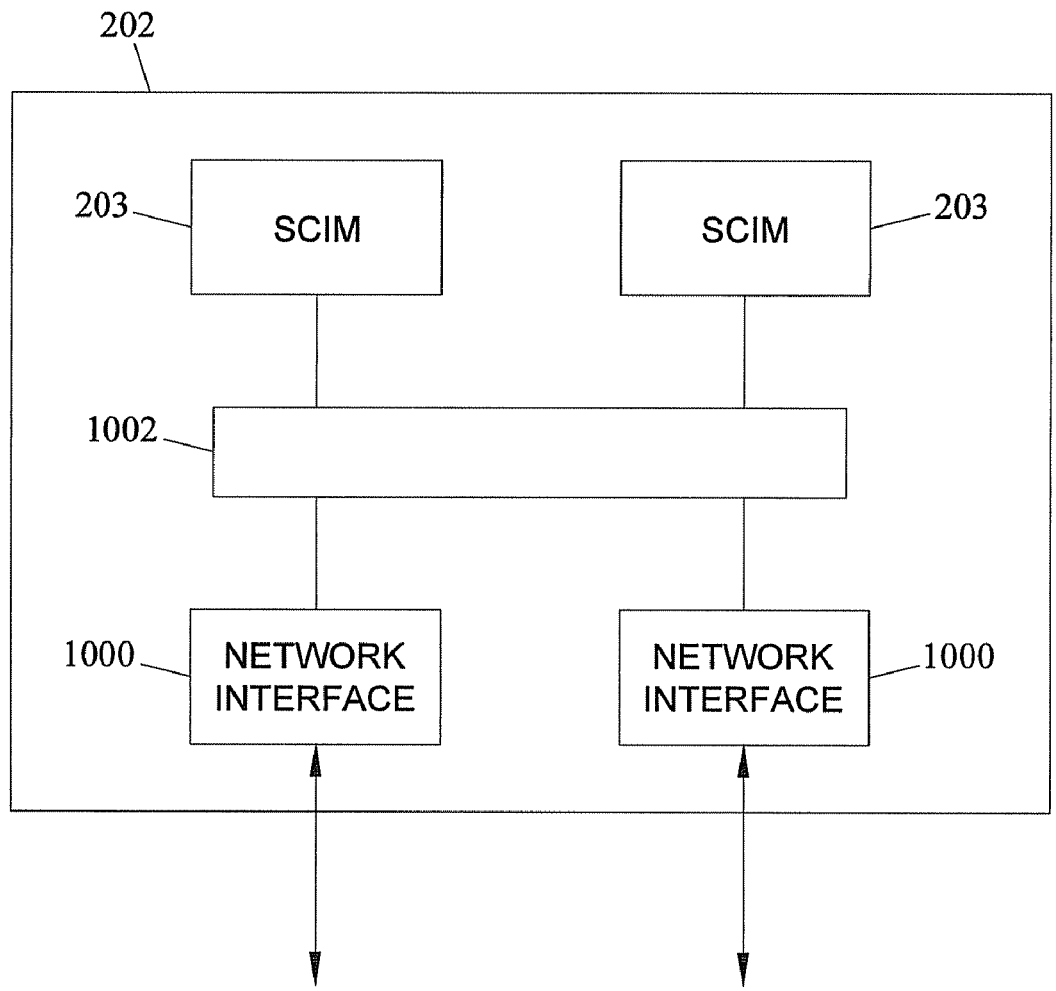
FIG. 10 is a block diagram of an exemplary early media connection proxy according to an embodiment of the subject matter described herein.

FIG. 10 is a block diagram of an early media connection proxy 202 according to an embodiment of the subject matter described herein. Referring to FIG. 10, early media connection proxy is implemented on a processing platform including a distributed internal processing architecture. For example, SCIMs 203 may be identically provisioned for redundancy or load sharing purposes and may be implemented on separate printed circuit boards. Each SCIM 203 may include one or more processors for implementing the functions described herein for SIP early media connection proxying. Early media connection proxy 202 may include network interfaces 1000 for interfacing with external signaling links. Network interfaces 1000 may implement SS7 over TDM, SS7 over IP, or SIP over IP protocol stacks.

In operation, one of network interfaces 1000 may receive a call setup signaling message, such as a SIP INVITE message, and determine that processing by one of SCIMs 203 is indicated. Accordingly, the receiving network interface 1000 may forward the received call setup signaling message to one of SCIMs 203 via bus 1002. The receiving SCIM 203 may determine that early media connection proxying is required using the method described above and initiate the signaling required to implement such proxying. Subsequent signaling messages received by early media connection proxy 202 for the call may be forwarded to the same SCIM that initiated the early media connection proxying.

In the examples described above, early media connection proxy 202 performs early media connection proxying for entities that are not compatible with SIP or other protocol extensions for early media connections. However, the subject matter described herein is not limited to this application. Early media connection proxy 202 may perform early media connection proxying by default or when the node that normally performs the signaling necessary to set up an early media connection is overloaded or unavailable. Performing early media connection proxying by default allows early media connection proxy 202 to omit the lookup for determining if the call involves an entity that is incompatible with SIP early media extensions. In such a case, once it is determined that early media connection service is required, early media connection proxy 202 may perform early media connection proxy on behalf of a network element (that is either capable or incapable of providing early media connection services) by setting up the early media connection between the calling party and a media relay server without involving the entity.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for early media connection proxying, the method comprising:
at an early media connection proxy implemented on a network node and using at least one processor of the network node:
receiving a call setup signaling message for establishing a call a between a calling entity and a called entity;
determining, based on at least one parameter in the call setup signaling message, whether an early media connection is required for the call, wherein determining whether early media connection proxying is required includes determining whether a network entity is an entity that does not support SIP extensions for early media connections;
determining whether early media connection proxying is required for the call; and in response to determining that an early media connection and early media connection proxying are required for the call, signaling on behalf of the network entity to establish an early media connection for the call.

2. The method of claim 1 wherein the network node comprises at least one of a signal transfer point (STP), a SIP signaling router (SSR), a SIP servicer, and a service control point (SCP).

3. The method of claim 1 wherein the call setup signaling message comprises a SIP INVITE message.

4. The method of claim 3 wherein signaling on behalf of the network entity includes performing SIP early media signaling with a SIP user agent client associated with the calling entity and a media relay server (MRS) to establish the early media connection between the MRS and the calling entity.

5. The method of claim 3 comprising, using the early media connection proxy, obtaining service information for media services to be provided over the early media connection and communicating the service information to a media relay server (MRS), wherein the MRS provides the media services to the calling entity over the early media connection based on the service information.

6. The method of claim 5 wherein the early media connection proxy obtains the service information from one of: an intelligent network service control point (IN SCP), a serving call session control function (S-CSCF), and a home subscriber server (HSS).

7. The method of claim 5 wherein the early media connection proxy communicates the service information to the MRS using one of: a SIP INVITE message, a SIP INFO message, and a SIP 18x message.

8. The method of claim 3 comprising, using the SIP early media connection proxy, after establishing the early media connection, signaling with the network entity to establish the call with the called entity.

9. The method of claim 8 wherein the network entity comprises a softswitch.

10. The method of claim 1 wherein the called party comprises one of a SIP entity and a PSTN entity.

11. The method of claim 1 wherein signaling on behalf of the network entity to establish the early media connection includes establishing the early media connection without involving the network entity.

12. A system for early media connection proxying comprising:
an early media connection proxy implemented on a network node, the network node including a network interface for receiving a call setup signaling message for establishing a call between a calling entity and a called entity; and
the early media connection proxy further including a service creation interaction manager (SCIM) for determining based on at least one parameter in the call setup signaling message, whether an early media connection is required for the call, for determining whether early media connection proxying is required for the call, and, in response to determining that an early media connection and early media connection proxying are required for the call, for signaling on behalf of a network entity to establish an early media connection for the call, wherein the SCIM is configured to determine whether the network entity is an entity that does not support SIP extensions for early media connections.

13. The system of claim 12 wherein the network node comprises at least one of a signal transfer point (STP), a SIP signaling router (SSR), a SIP servicer, and a service control point (SCP).

14. The system of claim 12 wherein the call setup signaling message comprises a SIP INVITE message.

15. The system of claim 14 wherein the SCIM is configured to perform SIP early media signaling with a SIP user agent client and a media relay server (MRS) to establish the early media connection between the MRS and the calling entity.

16. The system of claim 14 wherein the SCIM is configured to obtain service information for media to be played over the early media connection and to communicate the service information to a media relay server (MRS), wherein the MRS plays the media to the calling entity over the early media connection based on the service information.

17. The system of claim 16 wherein the SCIM obtains the service information from one of: an intelligent network service control point (IN SCP), a serving call session control function (S-CSCF), and a home subscriber server (HSS).

18. The system of claim 16 wherein the SCIM communicates the service information to the MRS using one of: a SIP INVITE message, a SIP INFO message, and a SIP 18x message.

19. The system of claim 14 wherein the SCIM, after establishing the early media connection, exchanges signaling with the network entity to establish the call with the called entity.

20. The system of claim 19 wherein the network entity comprises a softswitch.

21. The system of claim 12 wherein the called party comprises one of a SIP entity and a PSTN entity.

22. The system of claim 12 wherein the SCIM is configured to establish the early media connection without involving the network entity.

23. A non-transitory computer readable medium having stored therein executable instructions that when executed by the processor of a computer control the computer to perform steps comprising:
at an early media connection proxy implemented on a network node and using at least one processor of the network node:
receiving a call setup signaling message for establishing a call between a calling entity and a called entity;
determining based on at least one parameter in the call setup signaling message, whether an early media connection is required for the call;
determining whether early media connection proxying is required for the call, wherein determining whether early media connection proxying is required includes determining whether a network entity is an entity that does not support SIP extensions for early media connections; and
in response to determining that an early media connection and early media connection proxying are required for the call, signaling on behalf of a network entity to establish an early media connection for the call.

* * * * *